(No Model.)
T. A. EDISON.
MAGNETIC BELTING.
No. 457,343. Patented Aug. 11, 1891.
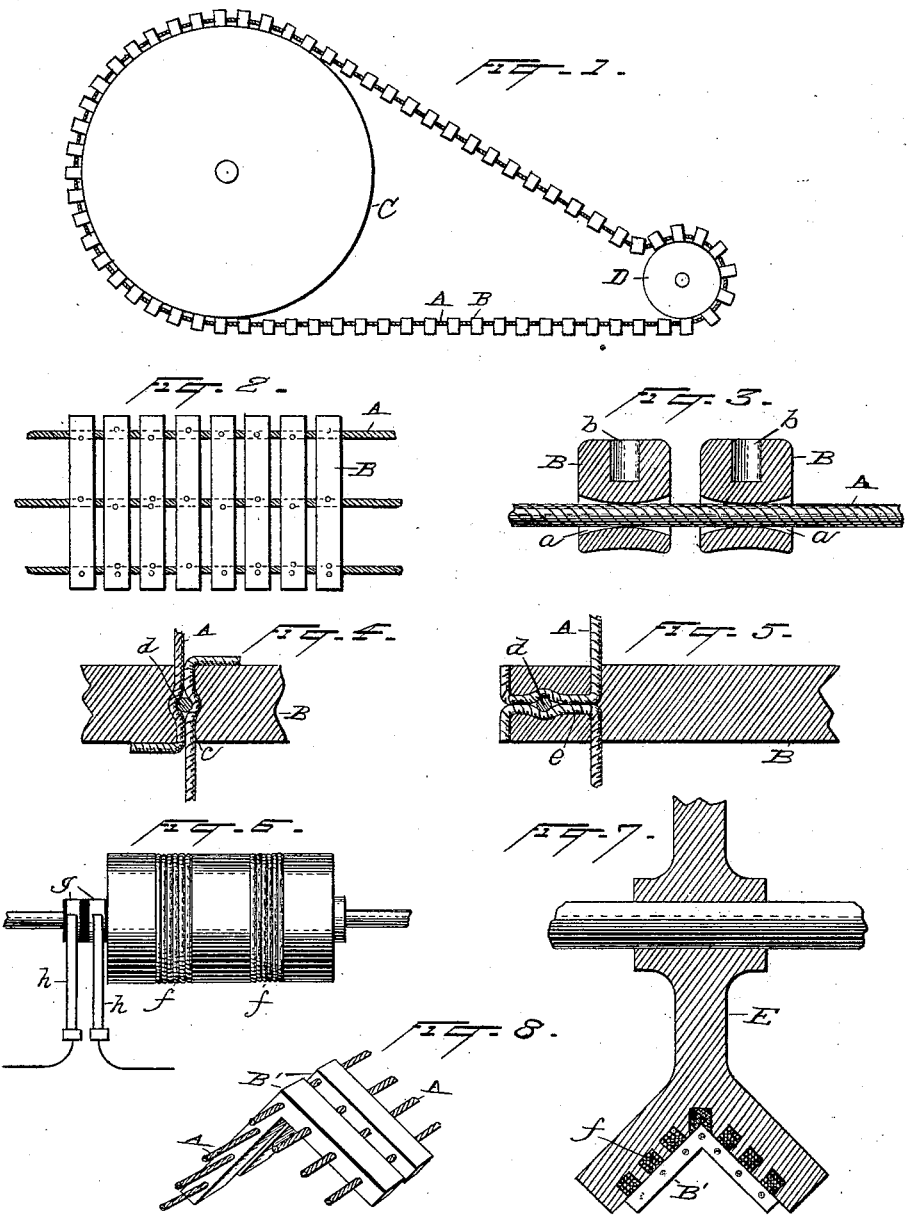
Witnesses
Norris A. Clark
Inventor
Thomas A. Edison
By his Attorneys
Dyer & Seely

UNITED STATES PATENT OFFICE.

THOMAS A. EDISON, OF LLEWELLYN PARK, NEW JERSEY.

MAGNETIC BELTING.

SPECIFICATION forming part of Letters Patent No. 457,343, dated August 11, 1891.

Application filed September 10, 1890. Serial No. 364,568. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Magnetic Belting, (Case No. 874,) of which the following is a specification.

My invention relates to magnetic belting wherein strongly-magnetized iron pulleys are employed, over which runs an endless belt constructed wholly or in part of magnetic material, whereby the adhesion of the belt to the pulleys is increased.

The object I have in view is to improve the construction of the magnetic belts, making them simpler and more durable; and, further, to increase the efficiency in operation of the magnetic belting by increasing the contact-surface at the smaller pulley.

The invention consists in the several novel devices and combinations of devices, as more fully hereinafter explained, and pointed out in the claims.

In the accompanying drawings, forming a part hereof, Figure 1 is a side view of the improved form of magnetic belting, showing both the belt and the pulleys over which it runs. Fig. 2 is a top view of a portion of the belt. Fig. 3 is a vertical section of a portion of the belt, showing means for securing the iron bars to the wire ropes. Figs. 4 and 5 are horizontal sections showing means for securing the ends of the wire ropes. Fig. 6 is a plan view of one of the pulleys, and Figs. 7 and 8 are views of a modified form of the belt and pulleys.

The improved magnetic belt is composed of a number of steel-wire ropes A, upon which are strung cross-bars B of soft iron. The wire ropes pass through holes $a$ in the bars B, which holes, as shown in Fig. 3, are preferably tapered from the center of the bar outwardly in both directions, and the bar is secured to the wire rope by "setting" the center of the bar upon the rope. This is accomplished by providing each bar over the horizontal hole $a$ through which each rope passes with one or more vertical holes or depressions $b$, extending from the top surface of the bar down to near the horizontal hole $a$, and by inserting a punch in the hole $b$ and driving it downwardly the metal of the bar will be "set" upon the rope, which will be pinched and held so that the bar is fixed in its position with relation to the rope. As shown in Fig. 2, there may be one hole $b$ for each hole $a$, or two. The bar being set upon the rope at its center and the hole $a$ flaring outwardly from that point in both directions, the flexibility of the belt is assured.

The ends of the wire ropes may be secured, as illustrated in Fig. 4, by passing the meeting ends into a horizontal hole $c$, which is large enough to receive them side by side, and is somewhat wider at the center of the hole than at its ends. A screw-bolt or rivet $d$ is forced down between the adjoining ends of the rope, pressing them outwardly into the enlarged center of the hole $c$, and securely holding the rope ends; or if the rope is the one at either end of the bar, as shown in Fig. 5, the ends may enter the bar from opposite sides and then be bent at right angles and passed out through a wider hole $e$, leading out through the end of the bar and provided with an enlarged center, like the hole $c$, a screw-bolt or rivet $d$ being used, as before, to spread the ends of the rope out into the enlarged center of the hole.

Various devices for securing the ends of the ropes may be employed, that illustrated being given only as one suitable way of doing this.

C D are the pulleys over which the endless belt runs. These pulleys are of iron, and are made strongly magnetic by means of magnet windings $f$, which are placed in one or more circumferential grooves, as illustrated in Fig. 6, and are connected with insulated rings $g$, upon which circuit springs $h$ rest, the springs $h$ connecting the magnet windings $f$ with the source of electrical energy. Both pulleys are made strongly magnetic, and the iron bars B of the belt bridge the magnet windings $f$ and close the magnetic circuits about such windings, the bars being attracted to the face of the pulleys and adhering strongly thereto.

In cases where a considerable reduction or increase in speed is to be attained, for which purpose my magnetic belting is well adapted to supplant tooth-gearing which heretofore only has been capable of use for that purpose, the surface of contact upon the smaller pulley D should be made as great as possible. For this reason the iron bars B are ground to a curve upon their inner faces, which curve corresponds with the surface of the small pulley, so that the bars passing over the small pulley are in contact with it throughout their entire surface. I also prefer to more strongly magnetize the small pulley D than the larger pulley C by suitably constructing the magnet windings $f$ to accomplish this end, as will be readily understood. The result of this is to make the belt "strip" more readily from the larger pulley than from the smaller pulley, to which latter the bars will cling, carrying the belt around over a greater surface of the pulley, as illustrated in Fig. 1, the belt being stripped tangentially from the larger pulley and radially from the smaller one, or approximately in this relation.

In Figs. 7 and 8 is shown a modified form of the belt and pulleys adapted for use where the space laterally is limited, so that a wide-face pulley cannot be conveniently employed. In this form the pulley E is made with a V-shaped face provided with the magnet windings $f$, and the soft-iron bars B' of the belt are made V-shaped.

What I claim as my invention is—

1. A magnetic belt having in combination one or more wire ropes and transverse iron bars, said wire ropes passing through the transverse bars, substantially as set forth.

2. In a magnetic belt, the combination of wire ropes and transverse iron bars secured thereto, the holes through which the ropes pass being made flaring in both directions, substantially as set forth.

3. In a magnetic belt, the combination, with wire ropes, of transverse iron bars through which the ropes pass, said bars being set upon the ropes, substantially as described.

4. In a magnetic belt, the combination of wire ropes and transverse iron bars, such bars being curved on their inner faces, substantially as set forth.

5. The combination, with large and small magnetic pulleys, the smaller pulley being more strongly magnetic than the larger, of a magnetic endless belt passing over such pulleys, substantially as set forth.

6. The combination, with large and small magnetic pulleys, of a magnetic belt passing over such pulleys and provided with transverse iron bars which bear upon the pulleys, such bars being curved on their inner faces to fit the smaller pulley, substantially as set forth.

7. The combination, with large and small magnetic pulleys, the smaller pulley being more strongly magnetic than the larger, of a magnetic belt passing over such pulleys and having transverse iron bars which bear upon such pulleys, such bars being curved on their inner faces to fit the smaller pulley, substantially as set forth.

This specification signed and witnessed this 6th day of September, 1890.

THOS. A. EDISON.

Witnesses:
RICHD. N. DYER,
W. PELZER.